March 17, 1964  G. F. HAWKES, JR  3,125,393
WIRING DEVICE WITH CORD CLAMP AND METHOD
OF FABRICATION THEREOF
Filed Jan. 24, 1962
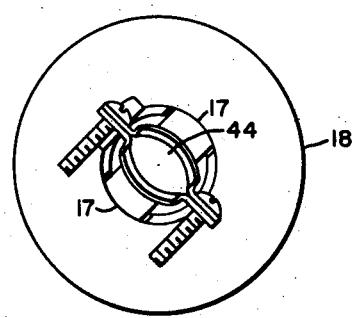
Fig. 2.
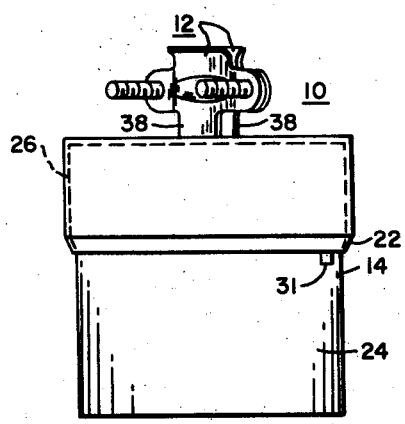
Fig. 1.
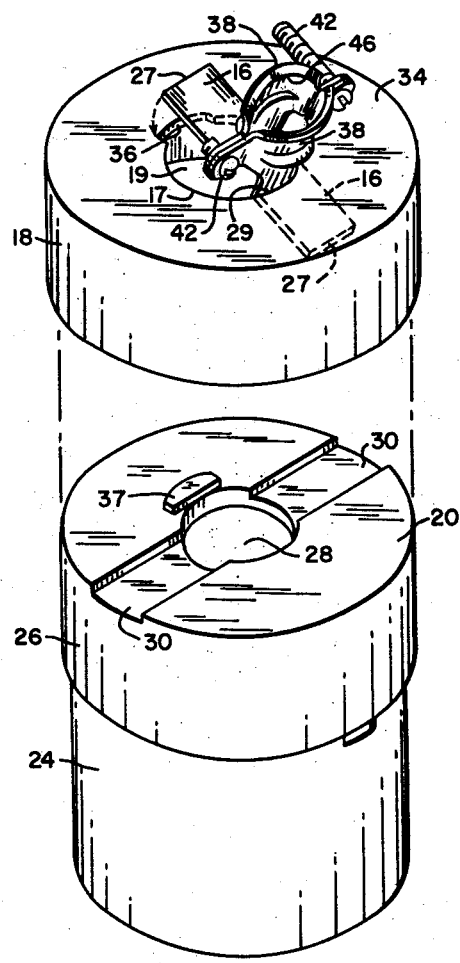
Fig. 3.
WITNESSES:
INVENTOR
George F. Hawkes, Jr.
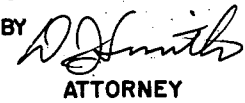
ATTORNEY

United States Patent Office 3,125,393
Patented Mar. 17, 1964

3,125,393
WIRING DEVICE WITH CORD CLAMP AND METHOD OF FABRICATION THEREOF
George F. Hawkes, Jr., Trumbull, Conn., assignor, by mesne assignments to Westinghouse Electric Corporation, a corporation of Pennsylvania
Filed Jan. 24, 1962, Ser. No. 168,417
3 Claims. (Cl. 339—103)

The present invention relates to wiring devices and, more particularly, to cord clamping arrangements used as a part of such devices.

In numerous wiring devices, such as plugs and connectors, a need arises for attaching an electrical supply cord to the device in such a manner as substantially to prevent any forces applied to the cord from being transmitted to the interior of the device where conductors forming a part of the cord are engaged with terminals supported in the device. In this manner, "strain relief" is provided for the respectively engaged conductors and terminals and, accordingly, the device can be used more freely without danger of impairing these engagements.

For a cord clamping arrangement to be characterized with comparatively maximum utility and efficiency, its included structure should be such as to provide for efficiently clamping a comparatively maximized range of cord sizes and should be producible with comparatively minimized manufacturing cost.

One type of cord clamping arrangement now commonly employed as a wiring device part includes a pair of generally L-shaped clamps which are positioned such that a first leg of each faces the first leg of the other. Fasteners or screws are employed to close or separate the opposing legs relative to a cord inserted between them. The other legs of the clamps extend outwardly from each other and each is ordinarily captivated against the wiring device by means of a retaining ring or cap having a central opening through which one of the legs of each clamp can be inserted during assembly of the cord clamping arrangement. The specific structural character provided for this typical cord clamping arrangement is determinative of both its efficiency and the economy with which it can be manufactured. Thus, a wiring device of the present invention includes a novel cord clamping arrangement which can be machine assembled with the device in an economic manner and which, when assembled, efficiently accommodates a relative maximum range of cord sizes.

Accordingly, it is an object of the invention to provide a novel wiring device having a unique and efficient cord clamping arrangement.

It is a further object of the invention to provide a novel and efficient wiring device in which a cord clamping arrangement includes a pair of L-shaped clamps having respective base legs which extend outwardly from each other and which are positively captivated relative to a housing of the wiring device by a unique retaining member having a generally circular opening through which upstanding legs of the clamps project.

It is another object of the invention to provide a novel and efficient method for assembling a pair of generally L-shaped clamping members with a wiring device housing so as to captivate the clamping members relative to the housing.

These and other objects of the invention will become more apparent upon consideration of the following detailed description along with the attached drawing, in which:

FIGURE 1 is an elevational view of a wiring device formed in accordance with the principles of the invention;

FIG. 2 is a top plan view of the wiring device shown in FIG. 1; and

FIG. 3 is a partially exploded isometric view of portions of the wiring device of FIG. 1.

In accordance with the broad principles of the invention, a wiring device comprises an insulative housing relative to which adjustably spaced L-shaped clamping members are captivated by a retaining member. In fabrication, the clamping members are first sub-assembled so that one leg of each faces the one leg of the other, and generally aligned and oppositely extending base legs of the clamping members are then inserted through a generally circular retaining member opening having a cross-dimension which is less than the dimension from the inner end of the base leg of one of the clamping members to the outer end of the base leg of the other clamping member. A slot in the retaining member extending radially outwardly from the opening enables this assembly step to be accomplished. The clamping member base legs and the retaining member slot are then angularly shifted out of alignment. Means are provided for securing the retaining member relative to the housing against separation as well as angular movement so as to captivate the base legs of the clamping members relative to the housing for movement in a direction radially of the retaining member opening and along guide channels in the housing which are then angularly displaced from the retaining member slot.

More specifically, in FIG. 1 there is shown a wiring device or connector 10 for which cord clamping means including a pair of generally L-shaped clamping members or clamps 12 are provided. The connector 10 includes an insulative housing 14 in which a plurality of conductive terminals (not shown) are supported for engagement with the conductive blades of a plug (not shown). The nature of the invention is such that the wiring device need not be in the form of a connector, as it can have other forms such as that of a plug.

Each of the clamps 12 includes an elongated base leg 16 which is captivated in relation to the housing 14 by retaining means or a retaining member 18 having a generally circular cord opening 19. In this instance, the retaining member 18 is in the form of a relatively rigid or metallic cap positioned on a side 20 of the housing 14. In other applications, the retaining member 18 can have other forms, for example that of a relatively rigid or metallic planar ring. In any event, suitable means are employed for securing the retaining member 18 against separation from the housing 14, for example an end portion of the retaining member 18 is turned over as indicated by the reference character 22 against the housing 14. It is to be noted that the housing 14 can be unitary or it can comprise plural insulative parts as in the connector 10. Thus, the housing 14 includes in this instance a base portion 24 and a cap portion 26 on which the housing side 20 is provided, and suitable means (not shown) are employed for securing the housing portions 24 and 26 together. Further, key means 31 can be employed to aid in assembly of the housing portions 24 and 26.

A cord opening 28 is provided through the housing side 20 and respective elongated and aligned channels or grooves 30 are recessed into the housing cap portion 26 from the plane of the housing side 20 for receipt of and for limited longitudinally directed movement of the clamp base legs 16. The dimension from an outer end 27 of either of the clamp base legs 16 to an inner end 29 of the other clamp base leg 16 is greater than the cross-dimension or diameter of the retaining member cord opening 19 and, therefore, an inwardly facing side of the retaining member 18 positively captivates the clamp base legs 16 in the channels 30. It is to be noted that each channel 30 in this instance extends without obstruction into the cord opening 28. Further, the channels 30 extend to the outer side of the housing 14, but in other applications of the invention, the channels 30 can be terminated short of the housing outer side.

The retaining member cord opening 19 extends through an outwardly facing side 34 of the retaining member 18 and the opening 19 is generally in alignment with the housing cord opening 28. A slot 36 is extended radially outwardly from the opening 19 along the retaining member side 34, and means, for example a housing projection 37 which engages the retaining member 18 in the slot 36, are provided for holding the retaining member 18 against rotation. Accordingly, since the housing channels 30 are angularly displaced from the projection 37 and the retaining member slot 36 removal of the clamps 12 from the channels 30 through the slot 36 is prevented.

Each clamp 12 is also provided with an upstanding leg 38 for cord clamping purposes. A pair of horizontal ears 40 are provided on each upstanding clamp leg 38 for the purpose of receiving respective adjusting means or screws 42 which are used to close or separate the clamp legs 38 relative to a cord (not shown) which can be extended through a space 44 (FIG. 2) between the clamp legs 38 and through the cord openings 19 and 28 for suitable conductive securance to the aforementioned terminals within the connector 10. As indicated by the reference character 46 (FIG. 3), the clamp legs 38 are horizontally rounded to be suitably concave for maximum surface engagement with an inserted cord.

To assemble the clamps 12 with the housing 14, the clamps 12 first are secured together as a sub-assembly with use of the screws 42. This operation is more economical in machine assembly than is an alternative operation of securing the clamps 12 together after insertion of the upstanding clamp legs 38 through the retaining member opening 19 from within the retaining member 18.

The sub-assembled clamps 12 are then tilted, because of the limited radial space provided by the slot 36, relative to the retaining member side 34 (FIG. 3) and one of the base legs 16 is inserted through the retaining member opening 19 and under the retaining member side 34. The other clamp leg 16 is then placed through the retaining member slot 36 and the clamps 12 are moved angularly as a unit relative to the retaining member 18. (In many applications, the retaining member opening 19 is insufficiently sized to allow insertion of the subassembled clamps 12 and screws 42 from within the retaining member 18.)

The retaining member 18 and the clamps 12, accordingly, are then located on the housing 14 so that the respective clamp legs 16 are first located in the housing channels 30 and so that the housing projection 37 then is received in the retaining member slot 36, which, as noted previously, is angularly displaced from the housing channels 30. The retaining member 18 is then secured to the housing 14 as indicated by the reference character 22 to captivate the clamps 12 in operative position.

Accordingly, each clamp 12 can be moved radially outwardly of the housing 14 until its leg 16 is limited by engagement against an adjacent portion 17 of the peripheral edge of the retaining member opening 19. In this manner, maximum separation of the clamps is limited only by the diameter of the retaining member opening 19 and, therefore, a relative maximum range of cord diameters can be accommodated by the clamps 12. Simultaneously, positive captivation of the cord clamps 12 is provided for the reasons already presented.

In the foregoing description, an illustrative embodiment has been described only to point out the principles of the invention. It is desired, therefore, that the invention be not limited by the embodiment described here but, rather, that it be accorded an interpretation consistent with the scope and spirit of its broad principles.

What is claimed is:

1. A wiring device comprising an insulative housing, a pair of generally L-shaped clamping members having respective upstanding legs confronting each other, means for adjusting the spacing of said upstanding legs so as to provide for accommodating variously sized cords in clamped relation between the same, a generally circular cord opening extending through one side of said housing, a pair of diametrically opposed elongated channels extending along said one housing side into said housing cord opening, respective elongated base legs of said clamping members being located in said housing channels for movement therealong, and means for securing a retaining member on said one housing side, said retaining member having a generally circular cord opening in alignment with said housing cord opening, said retaining member cord opening having a cross-dimension less than the dimension from the outer end of the base leg of one of said clamping members to the inner end of the base leg of the other clamping member thereby enabling said retaining member to captivate said clamping member base legs in said housing channels, said retaining member having a slot extending radially outwardly of said retaining member opening to such an extent that the sum of the slot radial dimension and the retaining member opening cross-dimension is less than the dimension between the outer ends of said clamping member base legs thereby requiring said clamping members to be tilted when inserted through said retaining member opening, said slot being angularly displaced from said housing channels to prevent removal of said clamping member base legs from said channels, and said securing means preventing angular movement of said retaining member relative to said housing.

2. A wiring device comprising an insulative housing, a pair of generally L-shaped clamping members having respective upstanding legs confronting each other, means for adjusting the spacing of said upstanding legs so as to provide for accommodating variously sized cords in clamped relation between the same, a generally circular cord opening extending through one side of said housing, a pair of diametrically opposed elongated channels extending along said one housing side into said housing cord opening, respective elongated base legs of said clamping members being located in said housing channels for movement therealong, and means for securing a retaining member on said one housing side, said retaining member having a generally circular cord opening in alignment with said housing cord opening, said retaining member cord opening having a cross-dimension less than the dimension from the outer end of the base leg of one of said clamping members to the inner end of the base leg of the other clamping member thereby enabling said retaining member to captivate said clamping member base legs in said housing channels, said retaining member having a slot extending radially outwardly of said retaining member opening and being sufficiently sized to accommodate insertion of said clamping member base legs through said retaining member opening yet being angularly displaced from said housing channels to prevent removal of said clamping member base legs form said channels, and said securing means including a housing projection extending outwardly of said one housing side and insertable into said retaining member slot so as to prevent angular movement of said retaining member relative to said housing.

3. A method for assembling a wiring device housing with a pair of generally L-shaped clamping members having respective confronting upstanding legs and respective oppositely extending elongated base legs, said method comprising securing the upstanding legs of said clamping members together so as to allow adjustment in the spacing between the same, inserting the base leg of a first of said clamping members through a generally circular opening in a retaining member which opening has a cross-dimension less than the dimension from the outer end of the base leg of one of said clamping members to the inner end of the base leg of the other clamping member, inserting the base leg of the second clamping member through a slot extending radially outwardly of said retaining member opening, rotating said clamping members as a unit and said retaining member relative to each other so as to misalign said base legs and said slot, inserting said base legs in respective channels in one side of said housing, securing said retaining member to said housing with a housing projection disposed in said slot so as to prevent realignment of said slot with said base legs.

References Cited in the file of this patent

UNITED STATES PATENTS

| | | |
|---|---|---|
| 1,679,723 | Hubbell | Aug. 7, 1928 |
| 2,553,681 | Schmier | May 22, 1951 |
| 3,049,689 | Clarkson | Aug. 14, 1962 |
| 3,056,944 | Sundquist | Oct. 2, 1962 |